(12) United States Patent
Lombardo et al.

(10) Patent No.: US 9,874,002 B2
(45) Date of Patent: Jan. 23, 2018

(54) UNIVERSAL HAMMERLESS PIN AND RETENTION ASSEMBLIES

(71) Applicants: Pasquale Lombardo, Phoenix, AZ (US); Gaetano Lombardo, Phoenix, AZ (US)

(72) Inventors: Pasquale Lombardo, Phoenix, AZ (US); Gaetano Lombardo, Phoenix, AZ (US)

( * ) Notice: Subject to any disclaimer, the term of this patent is extended or adjusted under 35 U.S.C. 154(b) by 0 days.

(21) Appl. No.: 15/380,854

(22) Filed: Dec. 15, 2016

(65) Prior Publication Data

US 2017/0167118 A1 Jun. 15, 2017

Related U.S. Application Data

(60) Provisional application No. 62/267,893, filed on Dec. 15, 2015.

(51) Int. Cl.
*E02F 9/28* (2006.01)
*F16B 15/00* (2006.01)

(52) U.S. Cl.
CPC .......... *E02F 9/2825* (2013.01); *E02F 9/2841* (2013.01); *F16B 15/00* (2013.01)

(58) Field of Classification Search
CPC .......... F16B 15/00; F16B 15/04; F16B 21/12; E02F 9/2816; E02F 9/2825; E02F 9/2833; E02F 9/2841
USPC ................................................ 411/356, 364
See application file for complete search history.

(56) References Cited

U.S. PATENT DOCUMENTS

| | | | | |
|---|---|---|---|---|
| 3,020,655 A * | 2/1962 | Launder | ............... | E02F 9/2841 37/453 |
| 3,448,652 A * | 6/1969 | Rhoads | ................. | E02F 9/2841 37/457 |
| 4,067,657 A * | 1/1978 | Kaarlela | ............... | E02F 9/2841 37/456 |
| 4,326,348 A * | 4/1982 | Emrich | ................. | E02F 9/2841 172/719 |
| 4,823,486 A * | 4/1989 | Diekevers | ............ | E02F 9/2841 37/456 |
| 5,765,301 A * | 6/1998 | Clendenning | ......... | E02F 9/2841 37/455 |
| 6,343,808 B1 * | 2/2002 | Luh | .......................... | B60D 1/06 280/511 |
| 6,439,796 B1 * | 8/2002 | Ruvang | ................. | E02F 9/2841 37/455 |

(Continued)

*Primary Examiner* — Roberta S Delisle
(74) *Attorney, Agent, or Firm* — Thomas W. Galvani, P.C.; Thomas W. Galvani (57) ABSTRACT

Several hammerless pin assemblies for coupling pieces of heavy equipment include a pin that uses a detent to engage the pin between the pieces of heavy equipment. In one embodiment, a pin is inserted between a tooth adapter and a tooth, and rotates between a disengaged position in which the tooth can be applied and removed from the tooth adapter, and an engaged position in which the pin locks the tooth on the tooth adapter. In another embodiment, a pin receives two spindles which slide into and out of an internal hollow in the pin to present or hide an abutment for coupling the two pieces of heavy equipment. In yet another embodiment, a pin and a cap cooperate to capture a washer which prevents removal of the pin from between the heavy equipment and thereby couples the pieces of heavy equipment to each other.

5 Claims, 8 Drawing Sheets

(56) References Cited

U.S. PATENT DOCUMENTS

| | | | |
|---|---|---|---|
| 6,708,431 B2 * | 3/2004 | Robinson | E02F 9/2825 37/456 |
| 8,104,200 B2 * | 1/2012 | Briscoe | E02F 9/2841 37/455 |
| 8,387,290 B2 * | 3/2013 | Campomanes | E02F 9/2825 37/456 |

* cited by examiner

UNIVERSAL HAMMERLESS PIN AND RETENTION ASSEMBLIES

CROSS-REFERENCE TO RELATED APPLICATIONS

This application claims the benefit of U.S. Provisional Application No. 62/267,893, filed Dec. 15, 2015, which is hereby incorporated by reference.

FIELD OF THE INVENTION

The present invention relates generally to heavy machinery equipment, and more particularly to ripper teeth, tooth adapters, and the fasteners for coupling ripper teeth and tooth adapters to heavy machinery equipment shovels.

BACKGROUND OF THE INVENTION

Heavy machinery equipment is used in mining, excavation, demolition, construction, and similar activities. The parts of heavy machines which are used for digging are exposed to a great amount of wear in operation. For instance, a ground engaging tool has teeth which continually dig, rip, cut, or lift dirt, rock, concrete, metal, or other heavy and rugged materials, which constantly wear against and abrade the surface of the teeth.

Heavy machinery parts are expensive and time-consuming to repair or replace, so many pieces of equipment are applied with wear plates or wear structures which can be replaced more quickly. For instance, on a ripper, the tooth may be a durable cover fitted onto the end of the ripper shank, so that when the tooth wears out, the tooth is removed and replaced without the need to repair the entire ripper shank. By removing and replacing only those parts which directly engage with the ground, considerable time and expense can be saved.

However, there are many safety issues with current designs of replacement parts. Current designs generally require that a sledgehammer be used to install pins which secure the replacement parts on the ripper shank. The pins are hammered into the parts, and often a tool is placed against the pin and hammered with the sledgehammer. This can lead to serious injury when the tool moves, is broken, or the sledgehammer misses its mark. The safety organizations which regulate workplace safety, such as MSHA and OSHA, disapprove of pins and replacement parts which require sledgehammers for installation. Further, a sledgehammer is also frequently used to remove the pin, by hammering the pin out of the replacement part. Again, this often leads to serious injury.

Many manufacturers of such replacement parts also incorporate unique or proprietary features in the parts that make removal and replacement difficult and expensive. Some manufacturers build replacement parts with special slots that will only accommodate their own tools. Others build parts that will only accept their own replacement parts. For instance, on a shovel, a tooth adapter fit on the shovel may be specially formed to only accept a tooth from the same manufacturer that made the adapter. Similarly, the tooth may have a slot or other engagement feature that requires that a proprietary pin be used to couple the tooth to the end of the adapter, because a slot formed between the adapter and the tooth will only accept those pins. Still further, some manufacturers may create coupling pins that require uniquely-shaped keys or tools to install or remove the pins. These fasteners can be difficult or dangerous to remove, risking bodily harm or even death, and generally incurring enormous opportunity costs while the shovel is prevented from operating. An improved fastening device for coupling heavy equipment parts is needed, as is an improved tooth and adapter assembly for heavy equipment.

SUMMARY OF THE INVENTION

Several hammerless pin assemblies for coupling pieces of heavy equipment include a pin that uses a detent to engage the pin between the pieces of heavy equipment. In one embodiment, a hammerless tooth adapter pin assembly includes a tooth adapter having a mount with a recess formed into a side of the mount. A lug is carried in the recess, and a tooth with a socket is configured to be fit onto the mount. The tooth includes a wall defining the socket, and a bore is formed through the tooth and along the wall. A pin is sized to be received in the bore and includes an axis, first and second sides opposed about the axis, a major notch corresponding in height to the recess, and a minor notch corresponding in height to the lug.

In another embodiment, a universal hammerless pin assembly for internally coupling pieces of heavy machinery includes a pin having a cylindrical sidewall, an internal hollow defined by an inner surface, opposed ends opening into the hollow, and lugs projecting inwardly inside the hollow from the inner surface. The assembly further includes spindles that have an inner end, an outer end, and an outer surface defining a constant diameter between the inner and outer ends. The spindles are snugly received in the hollow, and a groove formed in the outer surface is sized to receive the lugs.

In yet another embodiment, a universal hammerless pin assembly for internally coupling pieces of heavy machinery includes a pin having a cylindrical body, a reduced-diameter collar projecting therefrom, and a coaxial cylindrical socket formed into the body from the collar. A cap has a cylindrical head, a reduced-diameter shank projecting therefrom, and a shoulder disposed therebetween. Application of the cap on the body defines an inset circumferential channel formed by the collar of the pin and the shoulder of the cap. A washer is seated in the channel and has an inner diameter sized to encircle and be received in the channel. The washer is prevented from axial movement out of the channel by the body of the pin and the head of the cap. The washer defines an interference configured to be disposed between and prevent relative movement the pieces of heavy machinery.

The above provides the reader with a very brief summary of the detailed description presented below, and is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings.

DETAILED DESCRIPTION

Figure 1:
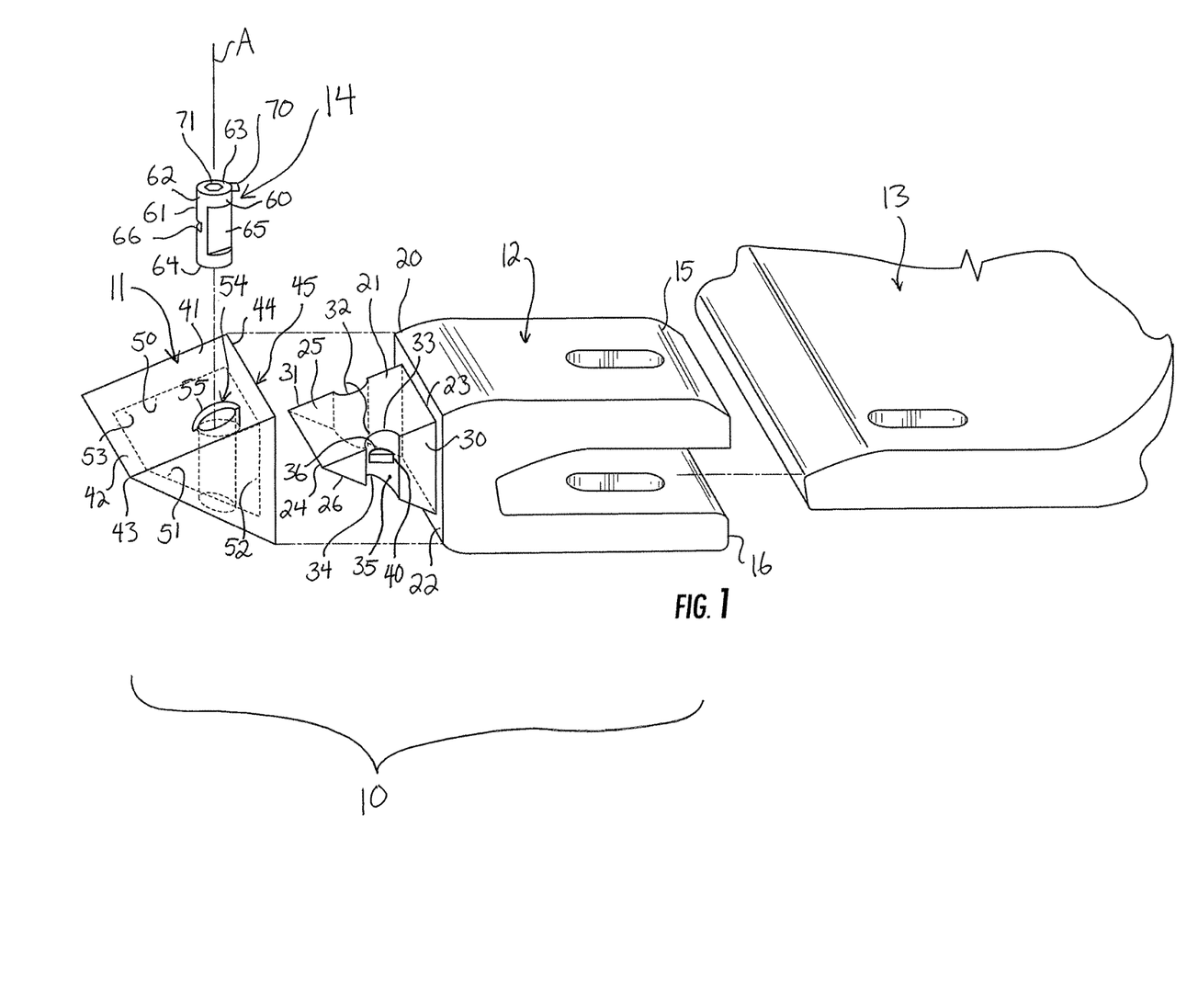
FIG. 1 is a side perspective view of a pin assembly including a tooth adapter, a tooth, and a pin.

Reference now is made to the drawings, in which the same reference characters are used throughout the different figures to designate the same elements. FIG. 1 illustrates a hammerless tooth adapter pin assembly 10 ("pin assembly 10") for securing a tooth 11 onto a tooth adapter 12 that is secured to a shovel 13 of an earth-working machine. The pin assembly 10 includes the tooth 11, the tooth adapter 12, and a pin 14 that binds them.

The tooth adapter 12 is mounted to the shovel 13 with a separate retention assembly. The tooth adapter 12 includes upper and lower jaws 15 and 16 at a rear end of the tooth adapter 12 that flank the shovel 13 and attach thereto. The tooth adapter 12 further includes a front end 20 formed with a mount 21. In FIG. 1, the mount 21 is shown as a triangular prism. The mount 21 is set into and extends from a front face 22 of the tooth adapter 12. The mount 21 has a wide base 23 that tapers to a forward edge 24, an oblique upper face 25, an opposed oblique lower face 26, and two sides 30 and 31.

A recess 32 is formed into each of the sides 30 and 31. The recesses 32 are identical, and as such, only one will be described herein, with the understanding that the description applies equally to the other. The recess 32 is semi-cylindrical, and extends inwardly into the mount 21 from the side 30. The recess 32 is located generally intermediately between the base 23 and the forward edge 24 and extends between the upper and lower faces 25 and 26. The recess 32 is open: it has an open top 33 and an open bottom 34. A concave or arcuate sidewall 35 extends therebetween.

The sidewall 35 has a notch 36. The notch 36 carries a key or a lug 40. The lug 40 is releasably applied in the notch 36, held in a snug fit arrangement. The lug 40 consists of a rigid, hard, and durable front, such as a chunk of metal, carried on an elastomeric backing. The lug 40 is carried in the notch 36 for depression; the elastomeric backing is snug fit into the notch 36 and compresses when a force bears down on the lug 40, thereby causing the lug 40 to recede into the notch 36. When the force is released, the elastomeric backing expands and returns to its original condition, causing the lug 40 to project into the recess 32.

The tooth 11 is releasably applied to the mount 12. Still referring to FIG. 1, the tooth 11 shown is highly generalized and not necessarily representative of a ripper tooth that might be used in the industry. Nonetheless, from the disclosure herein and the accompanying drawings, one having ordinary skill in the art will readily appreciate and understand the structure and operation of the tooth 11 herein. The tooth 11, as shown, includes a body 41 having an outer wear surface 42. The tooth 11 has opposed front and rear ends 43 and 44; at the rear end 44 is a socket 45 formed into the tooth 11. The socket 45 is in the shape of a triangular prism and includes an upper surface 50, a lower surface 51, and opposed walls or sides 52 and 53. Extending entirely through the tooth 11 from the top of the wear surface 42 through the bottom of the wear surface 42 is a bore 54. The bore 54 is cylindrical but is aligned along the side 52, such that as the bore 54 extends through the socket 45, it defines a semi-cylindrical recess into the side 52. Further, at the top of the wear surface 42 is a semi-cylindrical groove 55 encircling the half of the bore 54 that overlies the socket 45. The groove 55 has opposed ends formed with blunt stops.

The tooth 11 is secured to the tooth adapter 12 with the pin 14. With reference still to FIG. 1, the pin 14 is a generally cylindrical element having an axis A and two sides ("major side 60" and "minor side 61") opposed about the axis A. The pin 14 has a sidewall 62 extending from a top 63 to a bottom 64 which is cylindrical but for two notches formed therein. A first, or major notch 65, is formed into the major side 60, and a second, or minor notch 66, is formed into the minor side 61. The major and minor notches 65 and 66 are both dados, formed latitudinally, or transversely to the axis A, across the major and minor sides 60 and 61, respectively. The major notch 65 has an axially tall flat face, while the minor notch 66 has an axially short flat face. Both of the major and minor notches 65 and 66 are disposed generally intermediately between the top 63 and the bottom 64 of the pin 14. Further, both of the major and minor notches 65 and 66 are open, such that they are not enclosed at their ends, the minor notch 66 includes a ramped entrance 67 (shown in FIG. 4B), wherein the entrance to the minor notch 66 is inclined to the flat face. In some embodiments, as shown in FIG. 1, the pin 14 includes a radially-projecting stub 70 at the top 63. The stub 70 is a small, short, integrally-formed projection from the sidewall 62. Also at the top is a socket 71 coaxially extending into the pin 14. The socket 71 preferably has a hexagonal cross-section to receive a conventional tool.

Figure 2:
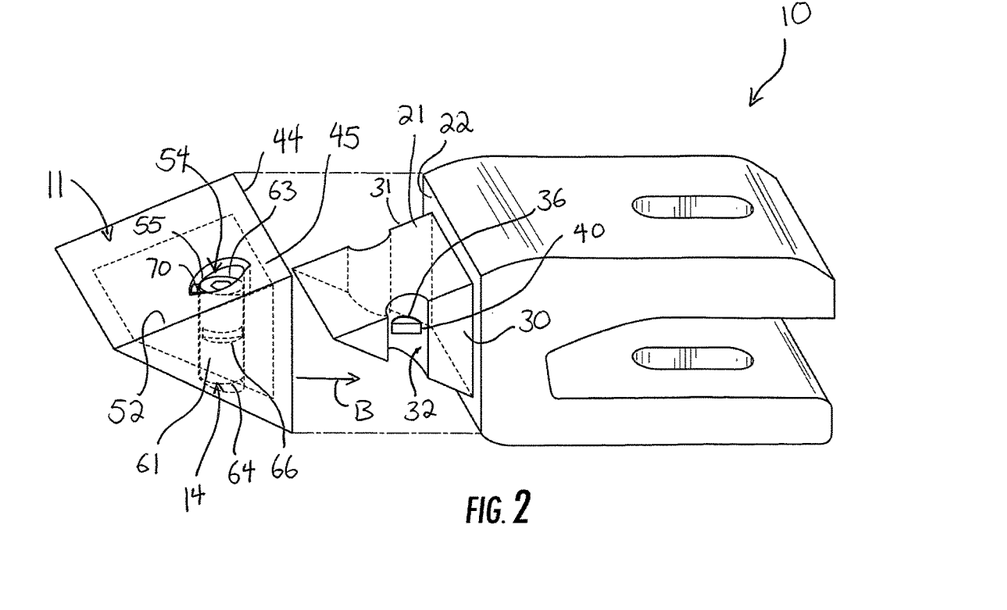
FIGS. 2 and 3 are side perspective views of the assembly of FIG. 1, illustrating the tooth being applied to the tooth adapter.

Turning now to FIGS. 2-6B, operation of the pin assembly 10 will be discussed. FIGS. 2-6B do not illustrate the shovel 13, but one having ordinary skill in the art will readily appreciate the involvement of the shovel 13 based on his experience and knowledge, and description of the shovel 13 is thus not necessary herein. One having ordinary skill in the art will understand that the operation described below is preferably undertaken after the tooth adapter 12 has been applied to the shovel 13, but the shovel 13 is removed for clarity of the illustrations. FIG. 2 illustrates the pin 14 applied to the tooth 11 in a first applied condition. The pin 14 is applied into the first applied condition by aligning and registering the pin 14 with the bore 54, with the bottom 64 of the pin 14 directed toward the top of the wear surface 42 of the tooth 11. The pin 14, so aligned, is then moved downward into the bore 54. When the pin 14 is partially installed in the bore 54, the pin 14 is received in the bore 54 for axial rotation, or rotation about its axis A. To place the pin 14 in a second applied condition, also shown in FIG. 1, the pin 14 is rotated so that the minor side 61 of the pin 14 is directed outwardly away from the socket 45, so that the minor notch 66 is disposed against the semi-cylindrical recess 32 into the side 52 and the major notch 65 is directed into the socket 45. The flat face of the major notch 65 is registered with and flush to the side 52 of the socket 45. This defines the pin 14 being in the second applied condition.

In the second applied condition of the pin 14, the pin 14 and the tooth 11 together are ready to be applied onto the tooth adapter 12. The tooth 11 is thus moved over the mount 21 of the tooth adapter 12. To do so, the sides 52 and 53 of the socket 45 are aligned with the sides 30 and 31 of the mount 21 and the tooth 11 is moved rearwardly along line B in FIG. 2, until the rear end 44 of the tooth 11 is flush in contact against the front face 22 of the tooth adapter 12. The tall flat face of the major notch 65, registered with the wall 52 of the socket 45, moves in sliding contact against the side 30 of the mount 21.

When the tooth 11 is applied over the mount 21 in this fashion, the pin 14 is in the third applied condition: the tooth 11 is received on the mount 21, the pin 14 is received in the bore 54, and the lug 40 is received in the major notch 65. The lug 40 slightly spaced apart from the flat face of the major notch 65, but is disposed in the major notch 65. However, the major notch 65 has a height which is coextensive to the height of the recess 32, and so the pin 14 may be rotated through the recess 32.

Figure 3:
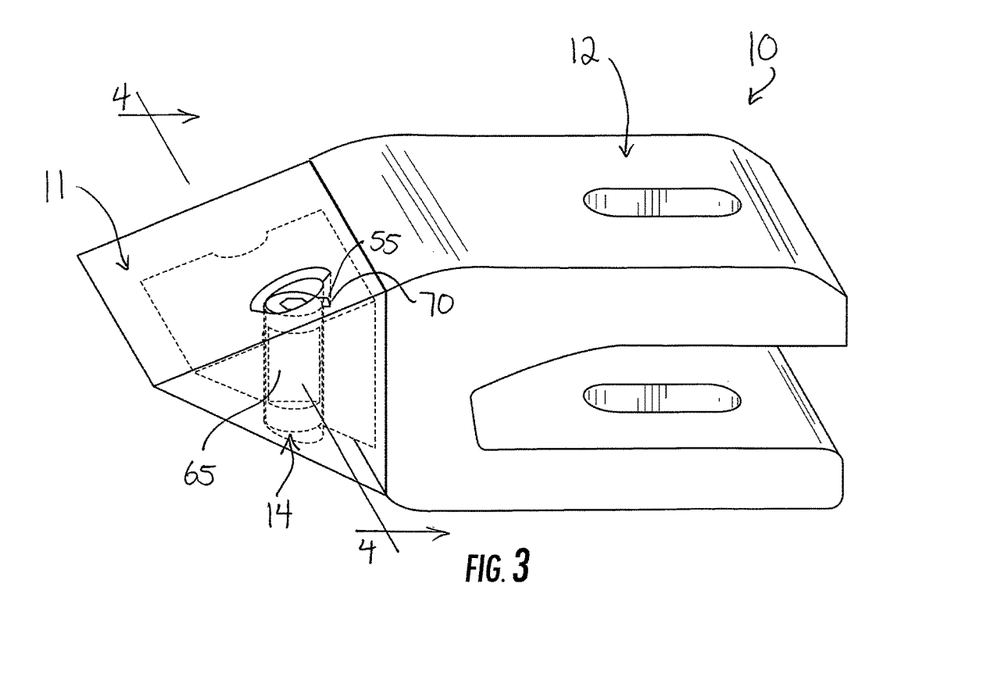

Rotating the pin 14 axially in the recess 32 moves the pin 14 from the third applied condition to a fourth applied condition, in which the lug is received in the minor notch 66, as shown in FIG. 3. When properly seated in the bore 54 with the stub 70 disposed in the groove 55, the minor notch 66 is axially aligned with the lug 40. The pin 14 may be rotated one hundred eighty degrees, limited in further rotation by the interaction of the stub 70 against the blunt end wall of the groove 55. The pin 14 is rotated, and in doing so, the sidewall 62 bears against the lug 40 to compress the elastomeric backing and urge the lug 40 into the notch 41 until the flat face of the minor notch 66 opposes the notch 36. When the pin 14 is fully rotated, the lug 40 does contact the end wall of the groove 55, preventing further rotation, and indicating that the minor notch 66 now directly opposes the lug 40. The elastomeric backing of the lug 40 expands back to its original condition and presses the metal front of the lug 40 into the minor notch 66.

In this way, the lug 40 acts as a key in the minor notch 66, allowing or preventing movement. When the lug 40 is received in the minor notch 66 in the fourth applied condition of the pin 14, the semi-cylindrical sidewall 62 is snug fit into the semi-cylindrical sidewall 35 of the recess 32. These two sidewalls 62 and 35 are complementary; the convex sidewall 62 is in full contact against the concave sidewall 35. This prevents lateral movement of the tooth 11 with respect to the tooth adapter 12. Movement along either direction on the line B of FIG. 2 is prevented by interaction of the sidewall 62 against the sidewall 35. Further, vertical movement of the pin 14 is prevented, because the minor notch 66 closely receives the expanded lug 40 therein. In this arrangement, the only way to remove the tooth 11 from the tooth adapter 12 is to rotate the pin 14 back to the third applied condition, where the lug 40 is received in the major notch 65 rather than the minor notch 66.

Figure 4A:
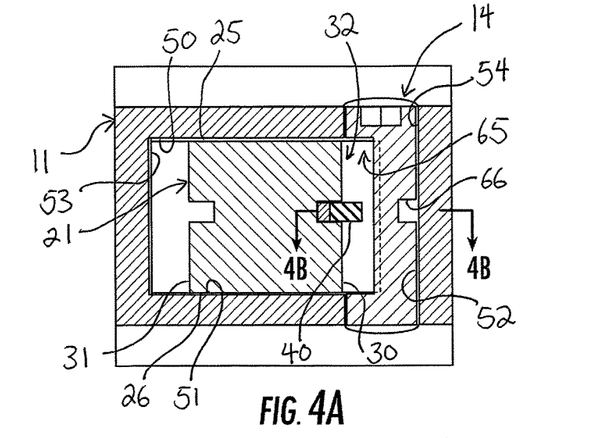
FIGS. 4A, 5A, and 6A are section views taken along the line 4-4 in FIG. 3 showing steps of rotating the pin of FIG. 1 between the tooth and tooth adapter.
Figure 4B:
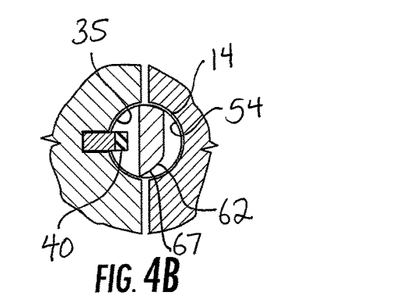
FIGS. 4B, 5B, and 6B are section views taken along the lines 4B-4B, 5B-5B, and 6B-6B in FIGS. 4A, 5A, and 6A, respectively showing steps of rotating the pin of FIG. 1 between the tooth and tooth adapter.

FIGS. 4A-6B show section views, some taken along the line 4-4 in different applied conditions of the pin 14, which illustrate the interaction of the tooth 11, the tooth adapter 12, and the pin 14. FIG. 4A shows the pin 14 in the third applied condition. There, the tooth 11 is received on the mount 21. The pin 14 is within the bore 54. The pin 14 is mounted for rotation and may be rotated in either direction. However, FIG. 4A does show the pin 14 with the major face 65 directed toward the lug 40. The lug 40 is just spaced apart from the major face 65. It is seen clearly here that the height of the major notch 65 and the height of the recess 32 correspond to each other, thereby allowing the pin 14 to be rotated through the recess 32. FIG. 4B illustrates FIG. 4A from a top section view.

Figure 6A:
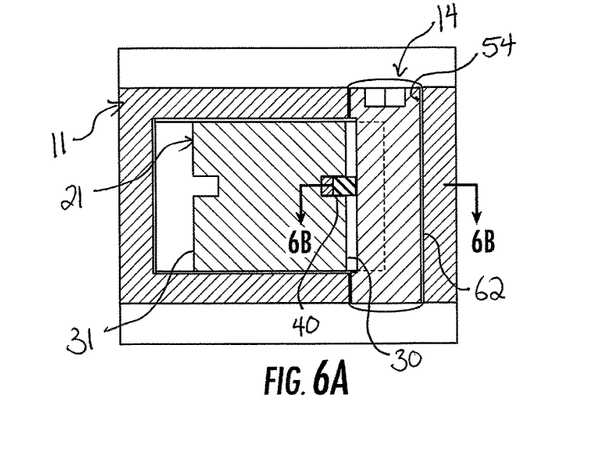
Figure 6B:
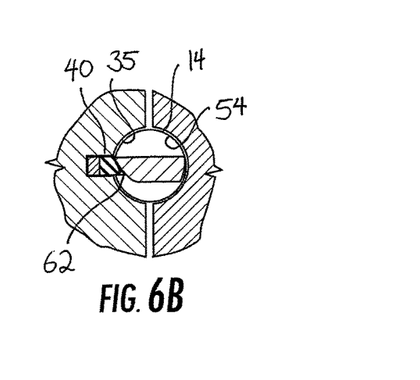

FIG. 6A shows a step in this rotation. The pin 14 has been partially rotated, approximately ninety degrees, so that the sidewall 62 of the pin 14 bears against the lug 40 and compresses it. FIG. 6B shows the lug 40 slightly compressed as well.

Figure 5A:
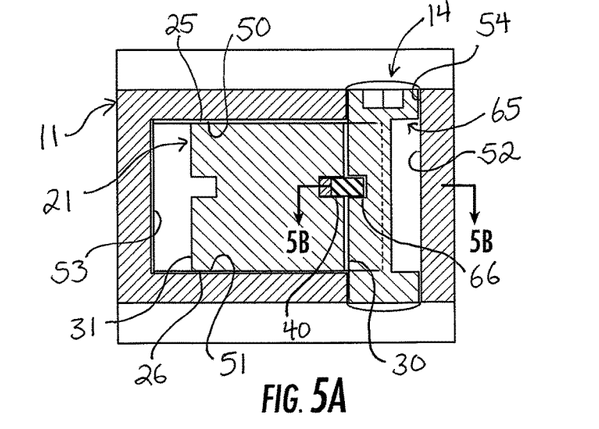
Figure 5B:
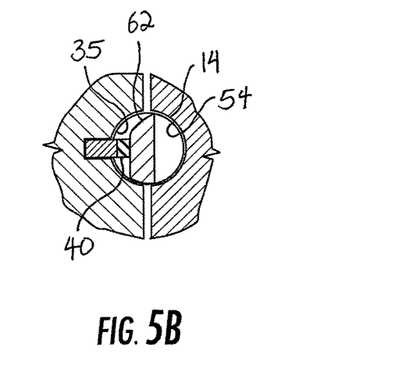

FIGS. 5A and 5B show the pin 14 in the fourth applied condition, in which the pin 14 is secured in the mount 21, and the tooth 11 is securely captured on the tooth adapter 12. There, the lug 40 is snugly received in the minor notch 66, and the pin 14 is clearly prevented from upward and downward axial movement.

FIGS. 7-10B illustrate a universal hammerless pin assembly 80 for coupling pieces of heavy machinery. The pin assembly 80 includes a pin 81 and two opposed, identical spindles 82 and 83. The pin assembly 80 is useful for internally coupling those pieces of heavy machinery at a hole, a pivot, or a joint, and is useful for doing so without the need for special or proprietary tools and without engaging with special or proprietary features in the heavy machinery. The pin assembly 80 couples pieces of heavy machinery by engaging securely with itself, rather than with interfaces, slots, sockets, or other features in the heavy machinery, to form an engagement between the heavy machinery which will not release accidentally and which will not bind, corrode, or deteriorate with use. The pin 81 receives and holds the spindles 82 and 83, which move out of and into the pin 81 to place the pin assembly 80 in an expanded and contracted configuration, respectively, as will be described, so as to engage and couple the pieces of heavy machinery.

Figure 7:
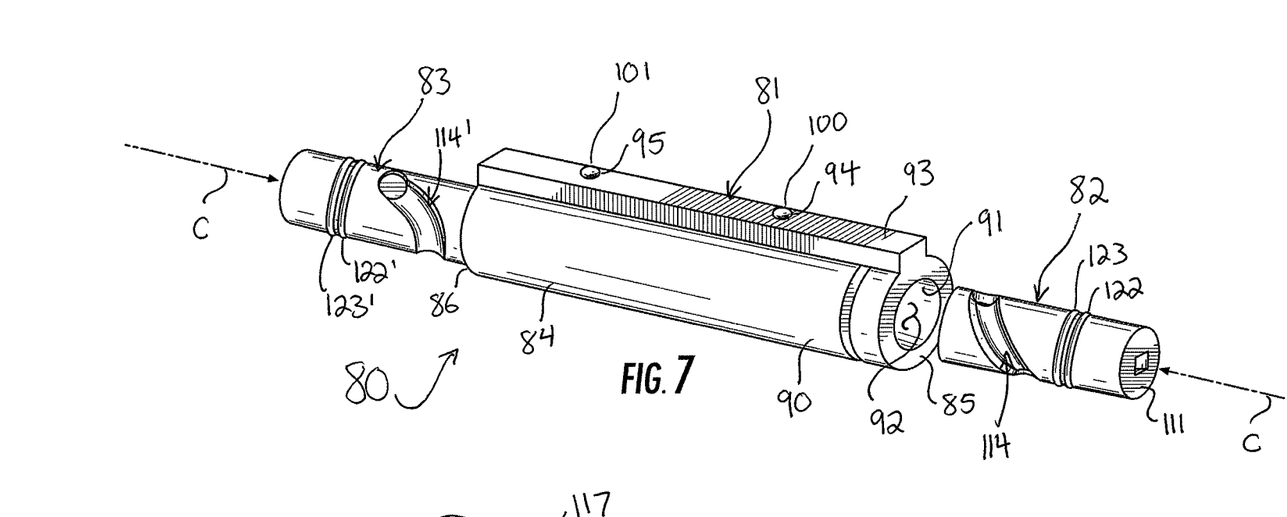
FIG. 7 is a side perspective view of a pin assembly including a pin and two spindles.

Referring first to FIG. 7, the pin 81 is an elongate member including a cylindrical sidewall 84 extending from a first end 85 to a second end 86 along an axis. The sidewall 84 includes an outer surface 90 and an inner surface 91. The inner surface 91 is generally smooth and featureless, except as described below, and bounds and defines an internal hollow 92. The internal hollow 92 is long and cylindrical, extending entirely from the first end 85 to the second end 86, such that the pin 81 is open at both the first and second ends 85 and 86. An axial ridge 93 extends entirely along the pin 81 at the outer surface 90 and projects upwardly with a generally rectangular cross-section at the outer surface 90 of the sidewall 84. The pin 81 is preferably formed from a single, unitary piece of rigid, hard, durable, and rugged material, such as steel or iron.

Figure 9A:
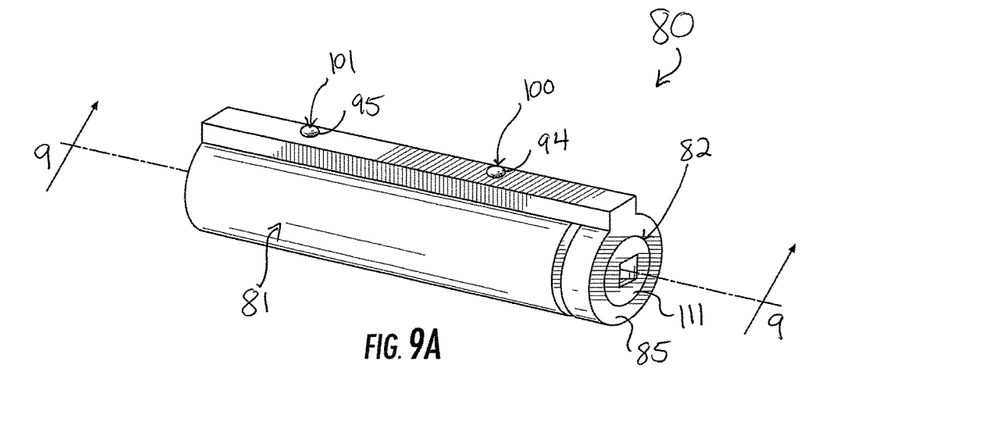
FIGS. 9A and 10A are side perspective views of the pin assembly of FIG. 7 in a contracted and expanded configuration, respectively.
Figure 9B:
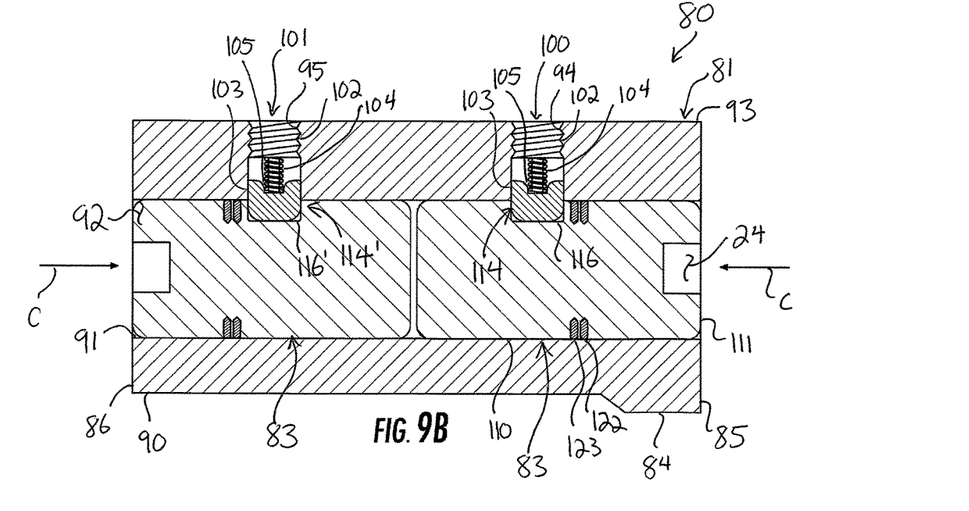
FIGS. 9B and 10B are section views taken along the lines 9-9 and 10-10 in FIGS. 9A and 10A, respectively, showing the pin assembly of FIG. 7 in a contracted and expanded configuration, respectively.

Referring now to FIGS. 7 and 9B, two bores 94 and 95 are formed in the pin 81, extending radially from the ridge 93 entirely through the sidewall 84 and the inner surface 91 of the pin 81. The bores 94 and 95 are threaded proximate to the outer surface 90 and unthreaded proximate to the inner surface 91, and receive lugs 100 and 101, respectively. The lugs 100 and 101 are detents, which are catches that prevent motion with respect to the detents until the detents are released, compressed, or acted upon. The lugs 100 and 101 are identical. Each includes a threaded plug 102, a rigid and hard head 103, and a helical coil spring 104 compressed between the plug 102 and the head 103. Each plug 102 has external threading and is threadably engaged with the threaded portion of the bores 94 and 95. The plug 102 is engaged to a depth such that the back of the plug 102 is flush with the outer surface 90 at the ridge 93. When so positioned, the head 103 just protrudes the bore 94 or the bore 95. The spring 104 is a very rugged spring having a very thick gauge for compressing under high force. The spring 104 is captured in a socket 105 in the back of the head 103 and a socket at the leading end of the plug 102, such that the lug 100 is held together. The heads 103 of the lugs 100 project inwardly inside the internal hollow 92 of the pin 81 to engage with the spindles 82 and 83 and secure the spindles 82 and 83 in expanded and contracted conditions.

Figure 8:
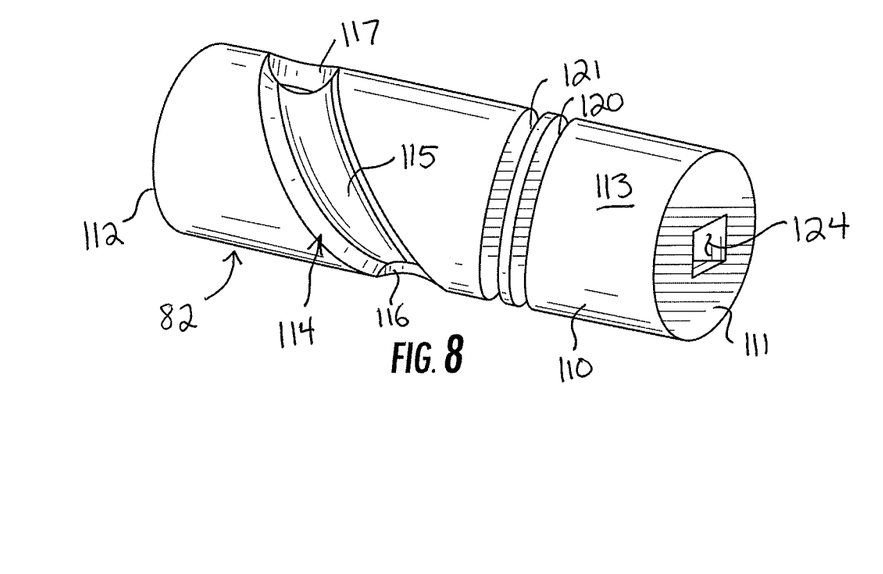
FIG. 8 is a side perspective of one of the spindles of FIG. 7.

The spindle 82 is shown in FIG. 8. The spindles 82 and 83 are identical in every respect but for application to the pin 81, and as such, the following description will be of the spindle 82 only, with the understanding that the description applies equally to the spindle 83. All reference characters used to identify the various structural elements and features of the spindle 82 are also used to identify identical structural elements and features of the spindle 83, but are marked with a prime symbol ("'") so as to designate and distinguish them from those of the spindle 82. The spindle 82 has as a solid, cylindrical body 110. The spindle 82 extends from a first end 111 to a second end 112 and has an outer surface 113 with several features configured for engaging with the pin 81. The spindle 82 has a constant diameter between the first and second ends 111 and 112.

Proximate to the second end 112 of the spindle 82, a groove 114 is formed into the outer surface 113 of the spindle 82, extending from just inboard from the second end 112 to a location generally intermediate between the first and second ends 111 and 112. The groove 114 wraps helically around the outer surface 113 and is shallow. The groove 114 includes an elongate, flat groove face 115 and opposed first and second catches 116 and 117. The first and second catches 116 and 117 are both circular and deep; they both extend deeper radially into the body 110 of the spindle 82 than the groove face 115 does, and the first catch 116 preferably extends into the body 110 the same depth as the second catch 117. The first and second catches 116 and 117 thus define capture spots in the groove 114 for the lugs 100 and 101. The first catch 117 is proximate to the second end 112 of the spindle 82, while the second catch 116 is opposed, intermediately located to the first and second ends 111 and 112. The groove 114, including the face 115 and the first and second catches 116 and 117 are sized to receive the heads 103 of the lugs 100 and 101 therein.

Between the groove 114 and the second end 111, or, in other words, distal to the groove 114, two spaced-apart, parallel, continuous annular channels 120 and 121 extend radially into the body 110 of the spindle 82. The channels 120 and 121 in FIG. 8 are shown empty for clarity; however, in FIG. 7, FIG. 9B, and FIG. 10B, the channels 120 and 121 hold gaskets 122 and 123, as they normally would in operation.

A socket 124 is formed into the first end 111. The socket 124 is preferably a square socket, but in other embodiments has a hexagonal or other shape, so as to accept a common and ubiquitous tool around a mining or construction site. The first end 111, and the second end 112, are both flat and perpendicular to the axis of the spindle 82, so that when the spindle 82 is applied to the pin 81, the first end 111 is flat and flush with the flat first end 85 of the pin 81. The spindle 82 is preferably formed from a single, unitary piece of rigid, hard, durable, and rugged material, such as steel or iron.

In operation, the pin assembly 80 is useful for engaging two pieces of heavy equipment about a hole, bore, slot or like coupling point. The pin assembly 80 moves between the contracted configuration, shown in FIGS. 9A and 9B, and the expanded configuration, shown in FIGS. 10A and 10B, to couple the two pieces of heavy equipment. To prepare the pin assembly 80 for such use, the lugs 100 and 101 are first slightly backed out of the bores 94 and 95, respectively, so that the heads 103 of the lugs 100 and 101 are flush with or inboard of inner surface 91. The spindles 82 and 83 are initially in a free condition in which they are free of the pin 81. The spindles 82 and 83 are then applied to the pin 81, or placed into an applied condition.

Turning to FIG. 7, the spindle 82 is applied to the pin 81 by registered the second end 112 of the spindle 82 with the internal hollow 92 (discussion will continue with reference to the spindle 82 alone, with the understanding that identical application and operation of the spindle 83 is clear in light of the description of the spindle 82). The spindle 82 is aligned with the internal hollow 92, such that the pin 81 and the spindle 82 are coaxially aligned. The outer diameter of the spindle 82 is just less than the inner diameter of the pin 81, and the spindle 82 is applied into the internal hollow 92 by moving the spindle 82 axially forward along arrowed line C.

The spindle 82 is moved axially forward along line C until the first end 111 of the spindle 82 is flush with the first end 85 of the pin 81. The lugs 100 and 101 are then slightly advanced by rotating them. This causes the lug 100 to either come into contact with the outer surface 113 of the spindle 82 or to slip into the first catch 116. The user is able to feel whether the lug 100 is against the outer surface 113 or in the first catch 116. If the lug 100 is against the outer surface 113, the user merely needs to rotate the spindle 82 until the first catch 116 of the groove 114 is aligned with the lug 100, at which point the lug 100 will pop into the first catch 116, which extends radially deeper into the spindle 82 than does the face 115 of the groove 114. Using a square wrench can be helpful in applying and rotating the spindle 82 in this manner. Once the spindle 82 is properly seated axially to the correct axial depth and the spindle 82 is rotated so that the lug 100 is aligned with the first catch 116, the user then continues to turn the threaded plug 102 of the lug 100 until the back of the plug 102 is flush with the outer surface 90 at the ridge 93, thereby ensures that the lug 100 is properly radially seated in the bore 94. In this manner, the lug 100 exerts a sufficient bias on the groove 114 to prevent the spindle from accidentally rotating or moving axially. FIGS. 9A and 9B illustrate this arrangement.

FIGS. 9A and 9B illustrate the contracted configuration of the pin assembly 80. The spindles 82 and 83 themselves are in a contracted condition, wherein the spindle 82 is disposed in the internal hollow 92 of the pin 81, the lug 100 is received in the groove 114, and the first end 111 of the spindle is inside the internal hollow 92. The spindle 82 does not project axially beyond the pin 81 and thus does not create an engagement or abutment beyond the pin 81. Arranging the pin assembly 80 into the expanded configuration, in which the spindles 82 and 83 are in expanded conditions, does cause the spindle 82 to project axially beyond the pin 81 thereby creating an engagement or abutment beyond the pin 81. Such an arrangement is shown in FIGS. 10A and 10B.

Before the pin assembly 80 is placed into the expanded configuration, the pin assembly 80 is applied to a hole, bore, or slot defined between two pieces of heavy machinery. The pin assembly 80 occupies the bore in a space corresponding to one of the pieces of heavy machinery when in the contracted configuration. The heavy machinery pieces can be separated and are not coupled or secured to each other. To couple them, the pin assembly 80 must be moved to the expanded configuration.

Figure 10A:
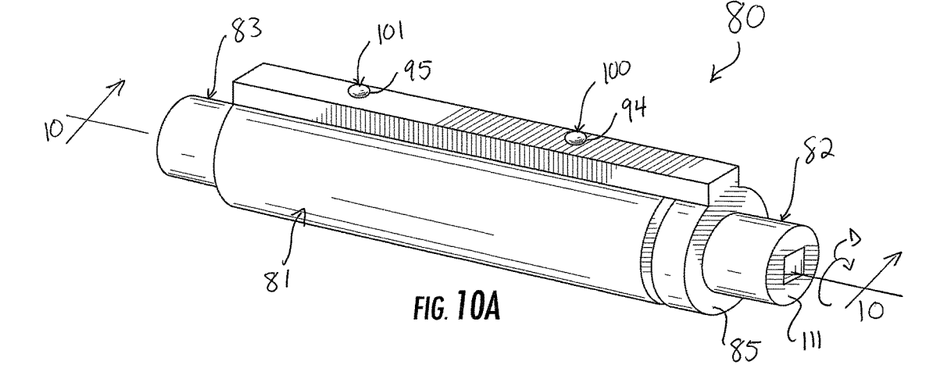
Figure 10B:
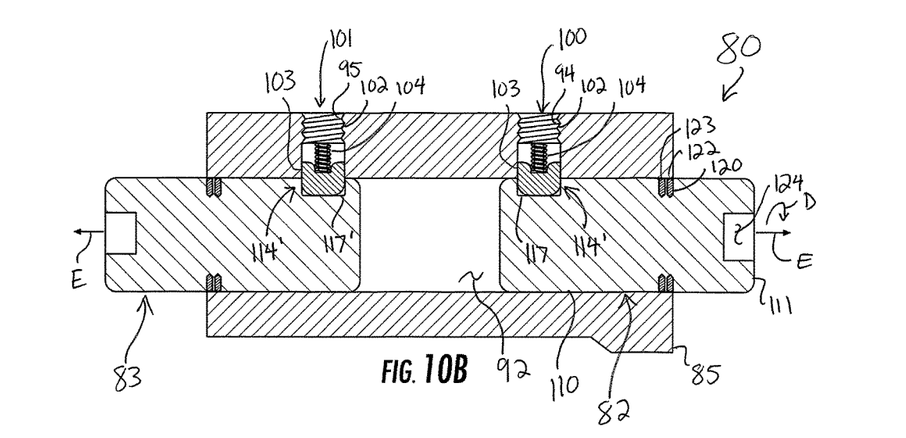

Referring now to FIGS. 10A and 10B, the pin assembly 80 is shown in the expanded configuration. To move the pin assembly 80 from the contracted configuration to the expanded configuration, the user takes up a square wrench and inserts it into the socket 124 of the spindle 82 and rotates the spindle 82 clockwise with respect to the pin 80 (as shown by the arcuate arrowed line D in FIGS. 10A and 10B). The user must place a sufficient amount of force on the spindle 82 to overcome the spring bias of the sprung head 103 in the first catch 116 of the groove 114. When a sufficient amount of force is applied, the head 103 of the lug 100 moves rearward toward the bore 94 in interaction against the face 115 of the groove 114, thereby compressing the lug 100. The compressed lug 100 guides movement of the spindle 82; as the user rotates the spindle 82 clockwise, the lug 100 remains in and tracks the groove 114, causing the spindle 82 to move axially out of the internal hollow 92 along the arrowed line E in FIG. 10B. Rotation, and corresponding outward axial movement, is continued until the head 103 of the lug 100 pops into the second catch 117, which extends radially deeper into the body 110 of the spindle 82 than does the face 115 of the groove 114.

When the head 103 of the lug 100 is received in the second catch 117, the channel 120 is located just inboard of the first end 85 of the pin 81. The gasket 122 carried in the channel 120 thus provides a seal between the pin 81 and the spindle 82 to prevent the intrusion of dirt, dust, and debris, and the gasket 123 provides a redundant seal inboard of the gasket 122. The first end 111 of the spindle 82 projects axially beyond the pin 81 and creates an engagement or abutment beyond the pin 81. A piece of heavy machinery, received on another piece of heavy machinery in which the pin assembly 80 is carried, is now coupled to the other piece of heavy machinery: it cannot be moved laterally against the abutment of the projecting spindle 82, and the spindle 82 is locked with the head 103 of the lug 100 in the second catch 116 and thus prevented from accidental movement. In this way, the pin assembly 80 is useful for coupling two pieces of heavy machinery.

A pin assembly 130 is illustrated in FIGS. 11A-15B. The pin assembly 130 includes a pin 131, a washer 132, and a cap 133. The pin assembly 130 is useful for internally coupling pieces of heavy machinery together at a hole or pivot joint, and is useful for doing so without the need for special or proprietary tools and without engaging with special or proprietary features in the heavy machinery. The pin assembly 130 couples pieces of heavy machinery by engaging securely with itself, rather than with interfaces, slots, sockets, or other features in the heavy machinery, to form an engagement between the heavy machinery which will not release accidentally and which will not bind, corrode, or deteriorate with use.

Figure 11A:
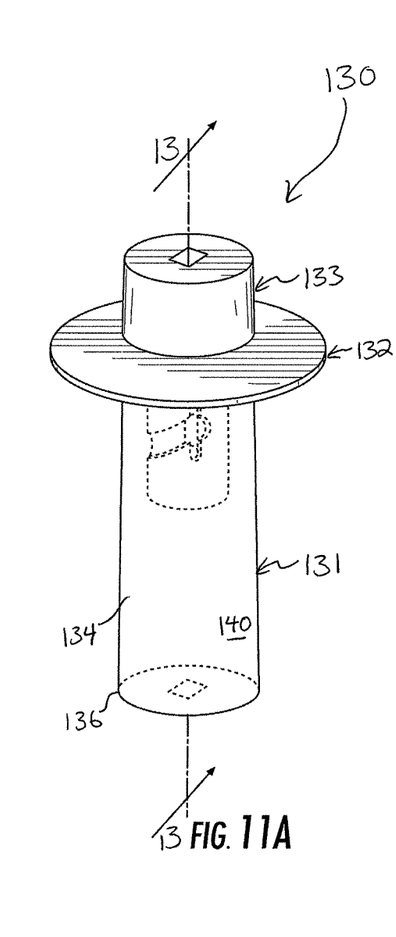
FIGS. 11A and 11B are top perspective and top exploded perspective views, respectively of a pin assembly having a pin, a cap, and a washer.
Figures 11B, 12:
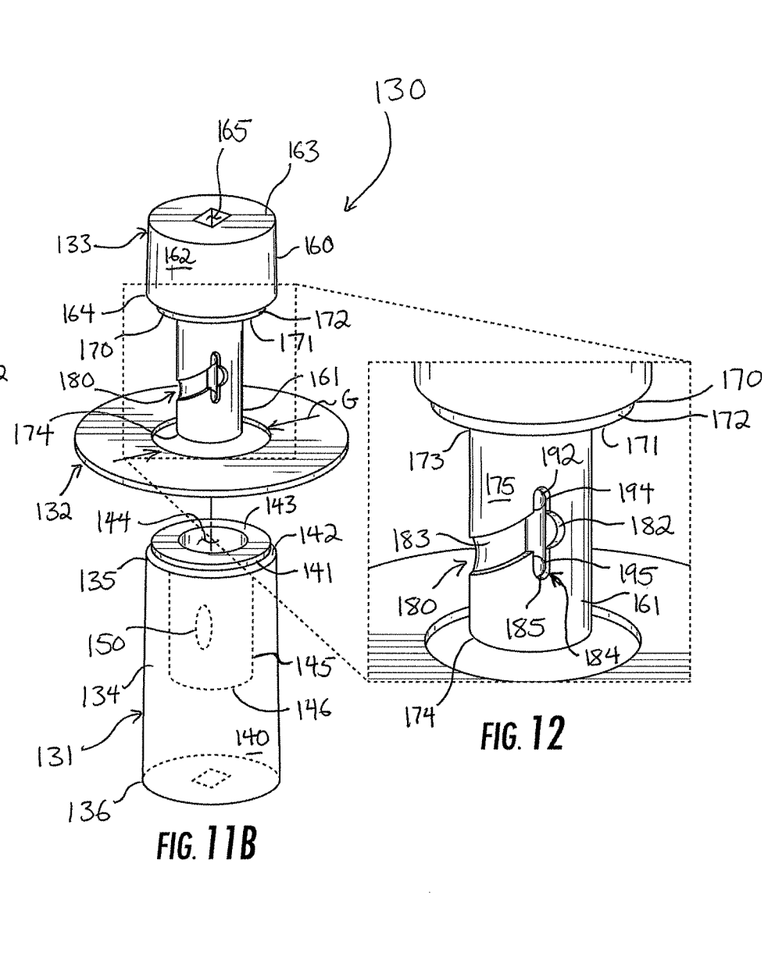
FIG. 12 is an detail view of a portion of FIG. 11B.

Referring primarily to FIGS. 11A and 11B, the pin 131 has a cylindrical solid body 134 extending from a top 135 to a bottom 136. The body 134 has a diameter which tapers from the bottom 136 to the top 135, so that the diameter is largest at the bottom 136 and smallest proximate to the top 135. The body 134 has an outer surface 140 which is generally smooth and featureless.

Proximate to the top 135, a collar 141 projects upwardly from the body 134. The collar 141 is a reduced-diameter, cylindrical extension integrally and monolithically formed with the body 134. The body 134 and the collar 141 are coaxial. The collar 141, because it has a smaller diameter than the body 134, is inset from the outer surface 140 of the body 134, and thus defines an annular shoulder 142 between the body 134 and the collar 141. The shoulder 142 has a diameter equal to the diameter of the collar 141. The collar 141 terminates in a flat, annular face 143, which encircles an opening into a socket 144.

The socket 144 of the pin 131 is a cylindrical recess formed coaxially into the body 134 from the face 143 of the collar 141. The socket 144 extends axially approximately halfway into the pin 131, includes a sidewall 145, and terminates in an endwall 146. The endwall 146 is featureless; the sidewall 145 is featureless but for a lug 150 that projects radially inward. The lug 150 is formed monolithically and integrally to the body 134 of the pin 131. The lug 150 has a generally elongate shape, oriented along the axis of the pin 131.

Still referring to FIGS. 11A and 11B, the washer 132 is an annular ring with a front face 151 and an opposed rear face 152 (shown in FIG. 2C), an inner sidewall 153 defining a diameter G, and an outer sidewall 154. It should be noted that "front" and "rear" are used only to identify and distinguish the front and rear faces 151 and 152 with common and easily understood modifiers, and not to indicate directionality of the pin assembly 130 or for any other such reason. The washer 132 is preferably constructed from a single, unitary piece of rigid, hard, durable, and rugged material, such as steel or iron.

The cap 133 includes a head 160 and a coaxial shank 161 projecting therefrom. The head 160 has a cylindrical outer surface 162 extending from a top 163 to a bottom 164. The top 163 of the head 160 is flat and formed with a square socket 165 to receive a tool therein. The head 160 has a slightly tapering diameter from the bottom 164 to the top 163, such that the top 163 is just slightly narrower than the bottom 164.

The shank 161 projects from a shoulder 170 below the bottom 164 of the head 160. The shoulder 170 steps the diameter of the head 160 at the bottom 164 of the head 160 down to the reduced diameter of the shank 161. The shoulder 170 is an upstanding, coaxial, cylindrical projection on the head 160 and has an annular bottom surface 171 and a sidewall 172. The head 160, shoulder 170, and shank 161 are preferably constructed integrally and monolithically from a rigid, hard, durable, and rugged material, such as steel or iron.

The shank 161 is a solid, cylindrical, and coaxial extension from below the shoulder 170. The shank 161 has a diameter which is approximately half the diameter of the head 160 proximate to the bottom 164 of the head 160. The diameter of the shank 161 is constant from a top 173 of the shank 161 to a bottom 174 of the shank 161. An outer surface 175 of the shank 161 is featureless but for a groove 180 extending helically from the bottom 174 of the shank 161.

FIG. 12 shows the groove 180 more clearly. The groove 180 extends from an open end 181 (shown in FIGS. 13A, 14A, and 15A) to a closed end 182. The groove 180 wraps helically around the outer surface 175 of the shank 161 between the open end 181 and the closed end 182, which is disposed approximately halfway between the top 173 and the bottom 174 of the shank 161. The groove 180 includes an elongate, flat groove face 183 at the open end 181 and along the length of the groove 180. The groove 180 terminates in a hold 184 proximate to the closed end 182, but between the open and closed ends 181 and 182. The hold 184 is an oblong recess formed radially into the body of the shank 161, deeper than the flat groove face 183 and the open and closed ends 181 and 182. The hold 184 is axially centered with respect to the closed end 182, but is longer than the width of the groove 180 in the axial direction.

A detent 185 is carried in the hold 184. Referring to both FIGS. 12 and 14A, the detent 185 is snug fit into the hold 184 and includes an elastomeric backing 190 having a flat base 191, and a rigid, hard, and durable front 192 with a rounded exterior 193. The front 192 is preferably constructed from a slug of metal, such as a steel or iron. Two latitudinal ridges 194 and 195 are on the front 192, extending latitudinally or transversely across the detent 185. These ridges 194 and 195 are axially spaced apart by a distance corresponding to the width of the groove 180. The detent 185 is carried in the hold 184 for depression; the elastomeric backing 190 is snug fit into the hold 184 both of which are flat, and compresses when a force bears down on the front 192 of the detent 185, thereby causing the detent 185 to recede into the hold 184. The elastomeric backing continuously exerts a bias directed radially outward from the shank 161, however. When the force is released, the elastomeric backing 190 expands and returns to its original condition, causing the detent 185 to resume its original posture.

The pin assembly 130 is structured to be easily assembled and disassembled. The pin 131, washer 132, and cap 133 are coaxial and are constructed to quickly fit onto each other. The pin assembly 130 moves between a disassembled condition, shown in FIG. 11B, and an assembled condition, shown in FIG. 11A. In the assembled condition, the pin assembly 130 moves between an applied condition, shown in FIGS. 15A and 15B, and an installed condition, shown in FIGS. 13A and 13B. FIGS. 13A-15B show steps of moving the pin assembly 130 between the applied and installed conditions, in the assembled condition, as would be undergone when using the pin assembly 130 for internally coupling pieces of heavy machinery.

Figure 13A:
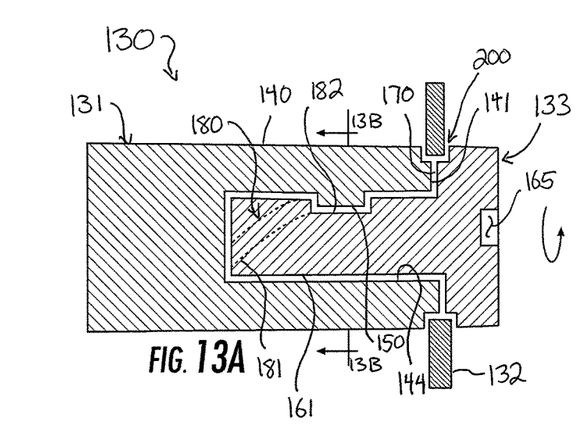
FIGS. 13A, 14A, and 15A are section views taken along the line 13-13 in FIG. 11A, showing steps of rotating the cap on the pin.
Figure 13B:
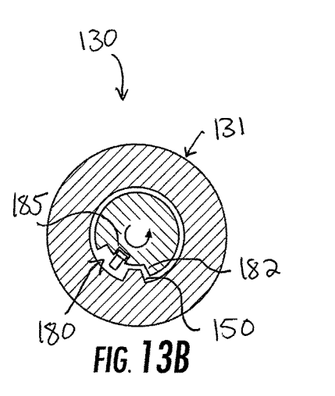
FIGS. 13B, 14B, and 15B are section views taken along the lines 13B-13B, 14B-14B, and 15B-15B in FIGS. 13A, 14A, and 15A, respectively, showing steps of rotating the cap on the pin.

Turning to FIG. 13A first, the pin assembly 130 is shown in the assembled condition, and the installed condition thereof. In this arrangement, the pin assembly 130 binds two pieces of heavy machinery (not shown) together, preventing them from inadvertently decoupling. FIG. 13A is a section view taken along the line 13-13 of FIG. 11A; FIG. 13B is a section view taken along the line 13B-13B of FIG. 13A. The cap 133 is applied to the pin 131 with the washer 132 disposed therebetween. In this assembled condition, the collar 141 of the pin 131 and the shoulder 170 of the cap 133 cooperate to define a circumferential channel 200 in the pin assembly 130, which extends slightly into the pin assembly 130 relative the outer surface 140 of the pin 131. The channel 200 is an inset band in the pin assembly 10, and has an inner diameter equal to the diameters of the collar 141 and the shoulder 170. Thus, the channel 200 tightly receives the washer 132 thereon. The sides of the channel 200, formed by the sidewall 172 and the collar 141, prevent the washer 132 from moving axially out of the channel 200. The collar 141 and the shoulder 170, when brought proximate to each other in the assembled condition of the pin assembly 130, form this engagement assembly, which lock the washer 132, preventing axial movement of the washer 132 with respect to the pin 131 and the cap 133.

FIGS. 13A and 13B show the lug 150 captured in the closed end 182, and thus, the pin assembly 130 in the installed condition. The lug 150 is kept in the groove 180 between the detent 185 and the closed end 182. The lug 150 encounters laterally the closed end 182 on one side and the detent 185 on the other side, and thus is prevented from rotational movement. Because the lug 150 is formed integrally to the body 134 of the pin 131, the pin 131 and cap 133 are thus also prevented from relative rotational movement. The lug 150 will not inadvertently move out of its kept position between the detent 185 and the closed end 182, and thus the cap 133 is securely installed and carried on the pin 131. In this configuration, the pin assembly 130 is effective at coupling pieces of heavy machinery.

Figure 14A:
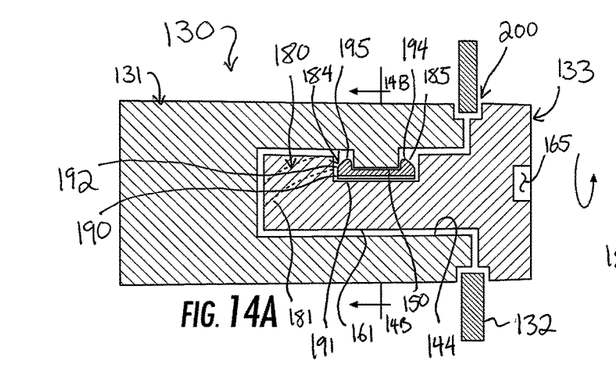

To decouple the pieces of heavy machinery, the pin assembly 130 must be disassembled. The cap 133 must first move from the installed condition to the merely applied condition thereof, shown in FIGS. 15A and 15B. To arrange the cap 133 that way, the cap 133 must be rotated in the pin 131. A user takes up a wrench, such as a square wrench, and inserts it into the socket 165. The user rotates the wrench in the socket 165 to rotate the cap 133 in the pin 131. As shown in FIG. 14A, the lug 150 encounters the detent 185, forcing the detent 185 into compression within the hold 184. The lug 150 is disposed axially between the ridges 194 and 195; this prevents the lug 150 from slipping. Further, the flat base 191 of the elastomeric backing 190, compressed against the flat bottom of the hold 184, prevents the detent 185 from rotating, flipping, or otherwise turning; the flat base 191 maintains the detent 185 in its proper arrangement with the front 192 presented radially outward.

Figure 14B:
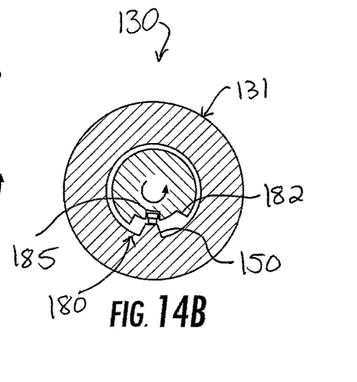
Figures 15A, 15B:
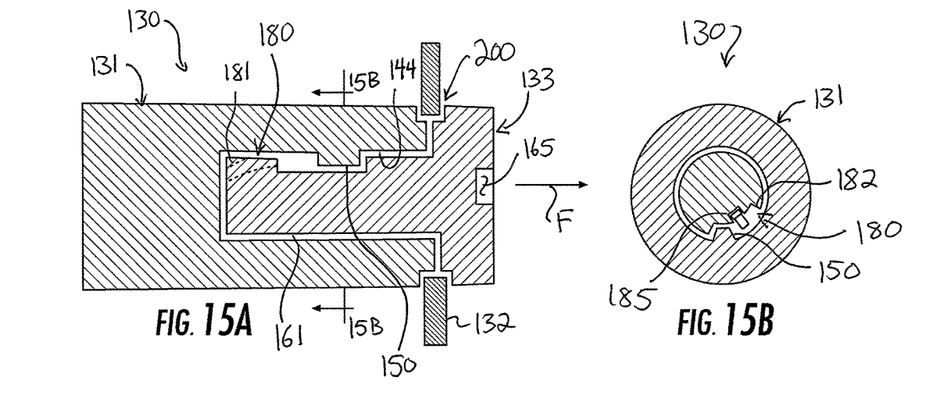

FIGS. 14A and 14B show the detent 185 compressed. The user continues to rotate the cap 133 in the pin 131, causing the lug 150 to pop over the detent 185 into the groove 180 just opposite the closed end 182. Released from the closed end 182, the lug 150 can now move freely through the remainder of the groove 180. Thus, in the applied condition shown in FIGS. 15A and 15B, the user can continue to rotate the cap 133 with respect to the pin 131. Because the groove 180 is helical, rotation of the cap 133 with respect to the pin 131 causes axial movement of the cap 133 out of the pin 131. The lug 150 guides movement of the cap 133; as the user rotates the cap 133 clockwise, the lug 150 remains in and tracks the groove 180, causing the cap 133 to move out of the socket 144 along the arrowed line F in FIG. 15A. Rotation, and corresponding outward axial movement, is continued until the shank 161 is completely free of the pin 131. At this point, the cap 133 is removed from the hole, bore, or slot that the pin assembly 130 is within, the overlying piece of heavy equipment is removed from the underlying piece, and the washer 132 and pin 131 are removed and replaced.

A preferred embodiment is fully and clearly described above so as to enable one having skill in the art to understand, make, and use the same. Those skilled in the art will recognize that modifications may be made to the described embodiment without departing from the spirit of the invention. To the extent that such modifications do not depart from the spirit of the invention, they are intended to be included within the scope thereof.

The invention claimed is:

1. A universal hammerless pin assembly for internally coupling pieces of heavy machinery, the pin assembly comprising:
    a pin having a cylindrical sidewall, an internal hollow defined by an inner surface, opposed ends opening into the hollow, and lugs projecting inwardly inside the hollow from the inner surface;
    spindles, each spindle having an inner end, an outer end, an outer surface defining a constant diameter between the inner and outer ends configured to be snugly received in the hollow, and a helical groove formed in the outer surface proximate to the inner end sized to receive the lugs; and wherein each spindle comprises an annular channel formed into the outer surface between the groove and the outer end;

wherein the spindles move between a free condition and an applied condition in which the spindles are applied to the internal hollow, and the lugs are received in the grooves of the spindles.

2. The universal hammerless pin assembly of claim 1, wherein the lugs are detents.

3. The universal hammerless pin assembly of claim 1, wherein each lug comprises:

a plug threadably engaged with a hole in the cylindrical sidewall of the pin;

a rigid head; and a spring disposed between the plug and the head.

4. The universal hammerless pin assembly of claim 1, wherein:

in the applied condition of the spindles, each of the spindles moves between a contracted condition and an expanded condition;

in the contracted condition, the spindle is in the hollow of the pin, the lug is received in the groove, the groove is inside the hollow, and the outer end of the spindle is inside the hollow; and in the expanded condition, the spindle is in the hollow of the pin, the lug is received in the groove, the groove is inside the hollow, and the outer end of the spindle is outside the hollow.

5. The universal hammerless pin assembly of claim 1, wherein:

the groove includes an elongate face between opposed ends;

the elongate face has a first depth; and the ends have a second depth greater than the first depth.

* * * * *